INVENTOR.
José Rosán
BY
MAHONEY, HALBERT & HORNBAKER
ATTORNEYS

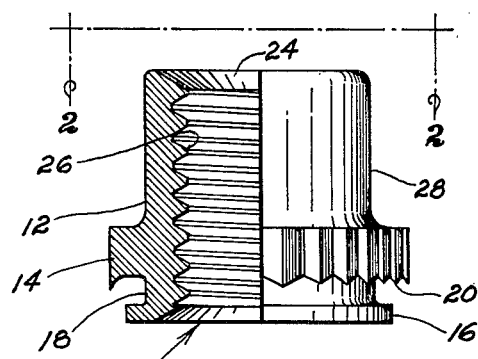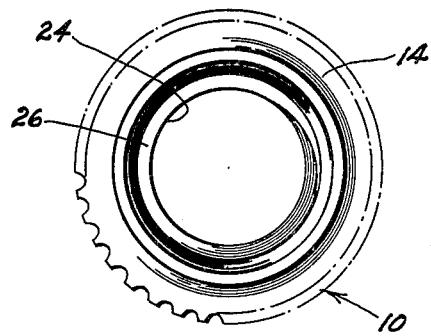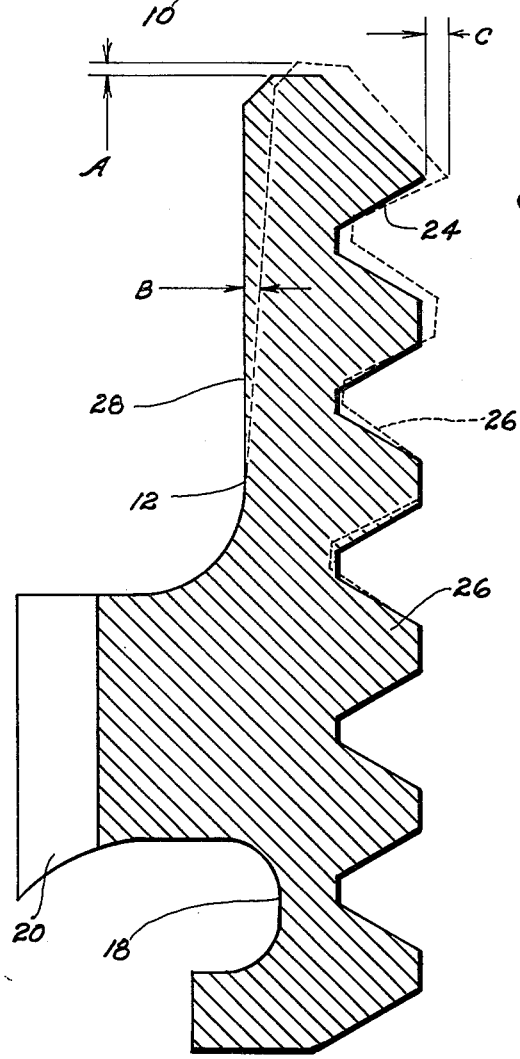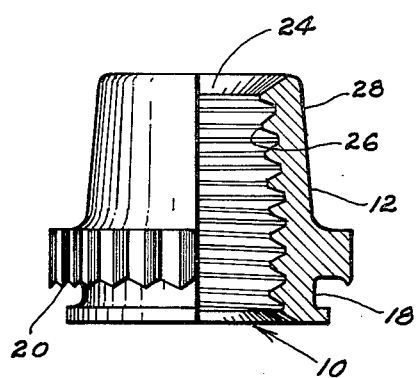
INVENTOR.
José Rosán
BY
MAHONEY, HALBERT & HORNBAKER
ATTORNEYS Dec. 7, 1965  J. ROSÁN  3,221,791
NUT-TYPE FASTENER INCORPORATING FRUSTO-CONICAL
LOCK AND METHOD OF FABRICATING SAME
Filed May 2, 1963  4 Sheets-Sheet 2

INVENTOR.
José Rosán
BY
MAHONEY, HALBERT & HORNBAKER
ATTORNEYS

Dec. 7, 1965  J. ROSÁN  3,221,791
NUT-TYPE FASTENER INCORPORATING FRUSTO-CONICAL
LOCK AND METHOD OF FABRICATING SAME
Filed May 2, 1963  4 Sheets-Sheet 4
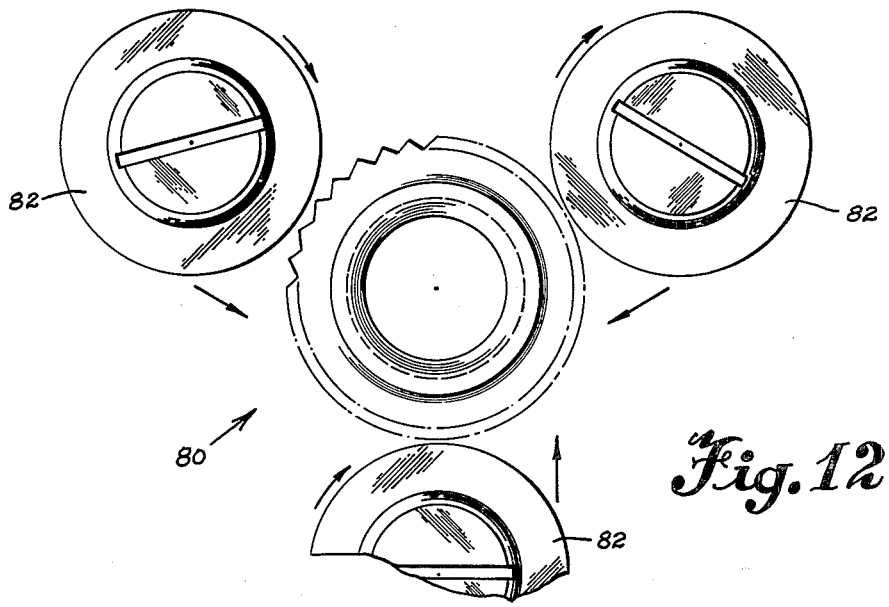
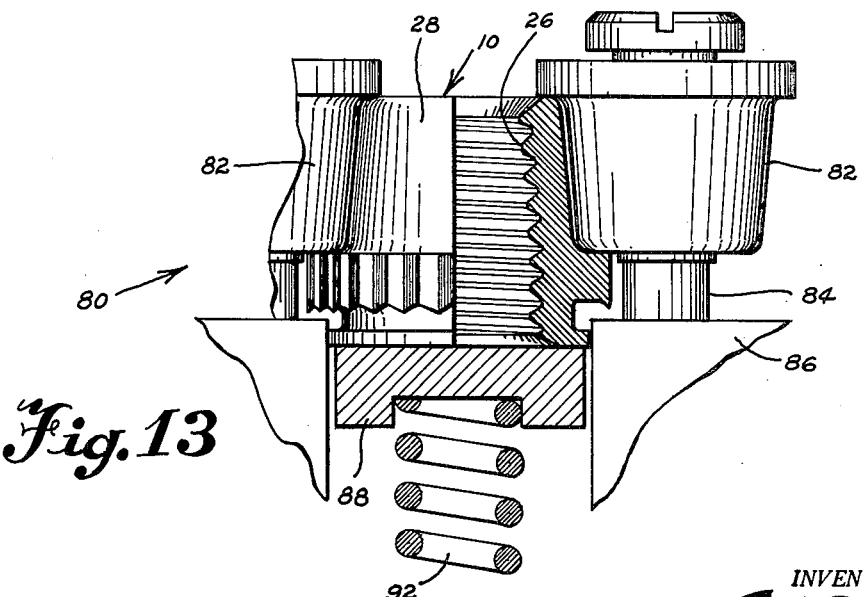
INVENTOR.
José Rosán
BY
MAHONEY, HALBERT & HORNBAKER
ATTORNEYS

United States Patent Office 3,221,791
Patented Dec. 7, 1965

3,221,791
NUT-TYPE FASTENER INCORPORATING FRUSTO-CONICAL LOCK AND METHOD OF FABRICATING SAME
José Rosán, San Juan Capistrano, Calif., assignor to Rosán Engineering Corp., Newport Beach, Calif., a corporation of California
Filed May 2, 1963, Ser. No. 277,622
4 Claims. (Cl. 151—21)

This invention relates to a fastener characterized by the incorporation of a thread lock of the self-locking type and to a method of fabricating the same.

More particularly, the invention relates to a fastener characterized by an elongated body incorporating an axial bore having an internal thread therein, the wall of said body being deformed in an area located between a point intermediate the extremities of said body and one extremity thereof by the provision of a uniform, inward taper thereupon which imparts to the portion of the thread underlying said area a corresponding taper serving as a self-locking thread lock adapted to engage the corresponding portion of a fastener inserted into operative engagement with said internal thread. Therefor, the inward taper provides what is, in essence, a frusto-conical configuration on the internal threads of the fastener.

The teachings of the invention are also directed to the method of fabricating a fastener incorporating said thread lock and, of course, it will be obvious to those skilled in the art that the teachings of the method of the invention may be applied with equal cogency to a wide variety of fastener configurations stipulating that the fasteners must incorporate internally threaded bores and have sufficient axial length to permit a substantial area thereof to be deformed into tapered cross section.

Various expedients have been suggested to accomplish the formation of self-locking thread locks in internally threaded fasteners, among them being the elliptical deformation of the fastener body, the squeezing of the fastener by a load imposed upon its opposite extremities, and the localized deformation of the fastener body by a force applied thereto externally thereof in a horizontal plane.

Such prior art expedients have been found to be inadequate because they entail either the random deformation of the internal threads of the fastener or the localized deformation thereof and are characterized by the fact that the deformed threads abruptly engage a male fastener inserted into operative relationship therewith with consequent impairment of the internal thread because of said random or localized deformation.

Furthermore, the aforementioned methods and structures result in fasteners which do not permit the removal of the associated fastener from the self locking portion of the internal thread and the subsequent reinstallation of said associated fastener into operative relationship with said thread because of the fact that the thread of the associated fastener, when inserted into operative relationship with the self-locking portion of the internal thread of the subject fastener, becomes so galled that the subsequent removal and reuse thereof is not feasible.

In a fastener constructed in accordance with the teachings of my invention, the self-locking portion of the internal thread is characterized by the fact that there is a uniform and gradual inward displacement of the successive convolutions of the thread in the tapered area of the fastener which permits sufficient lead to be obtained for entry of the associated fastener into gradual operative engagement with the self-locking portion of the internal thread. The practice of the method of the invention results, as will be described in greater detail hereinbelow, in the elongation of the body of the fastener with a consequent diminution of the wall thickness of the body in the frusto-conical area causing the internal threads to have a spring-like action during the insertion of a male fastener itno operative relationship with the internal threads.

Because of the gradual inward displacement of the internal threads an adequate lead is provided for the entry of the threads of the male fastener and the binding and galling characteristics of prior art devices are eliminated. In essence, an accordion-like action of the internal threads occurs as the male fastener gradually engages the internal threads thus providing a positive lock exerting a uniform locking pressure on the threads of the male fastener.

Therefore, it is always feasible and possible to remove and replace the associated fastener from and into operative engagement with the self-locking threads of the fastener of the invention because the threads on the associated fastener are not impaired, nor are the threads in the self-locking portion of the internal thread of the fastener of the invention so distorted as to prevent the re-use of either fastener.

The superior characteristics of the fastener of the invention are attributable, in large part, to the method of fabricating the same which, instead of abruptly distorting the internal threads of the fastener of the invention by the imposition of axial compressive loads on the body of the fastener or by the abrupt and massive radial displacement of the internal threads, achieves a gradual and inward orientation of the internal threads in the area of the self-locking portion thereof. Because of the gradual taper imparted to the internal threads in the self-locking area, a gradual elongation of the body of the fastener takes place which results in a correspondingly gradual displacement of the internal threads in the self-locking area and which, consequently, avoids the abrupt deformation of the threads characteristic of the utilization of prior art methods of forming self-locking threads.

Other objects and advantages of the invention will be apparent from the following specification and the accompanying drawings, which are for the purpose of illustration only, and in which:

FIG. 1 is a partially sectional view of a nut-type fastener prior to the formation of the frusto-conical lock thereupon;

FIG. 2 is a top plan view taken from the line 2—2 of FIG. 1;

FIG. 3 is a partially sectional view of the fastener of FIG. 1 after a lock has been formed therein;

FIG. 4 is an enlarged, fragmentary schematic view derived from an actual photocomparator analysis of the fastener of the invention illustrating the manner in which the gradual deformation and elongation of the body of the fastener occurs;

FIG. 12 is a top plan view of alternative forming dies utilized in fabricating the fastener of the invention; and FIG. 13 is a fragmentary, partly sectional view showing the manner in which the dies of FIG. 12 are utilized in forming the fastener of the invention.

Figure 5:
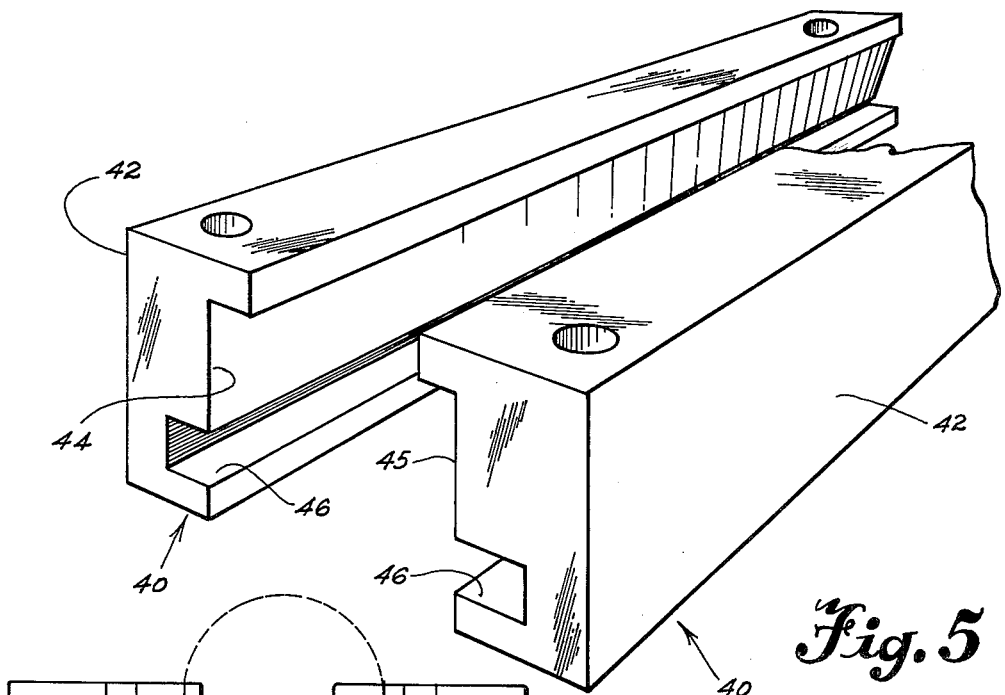
FIG. 5 is a perspective view illustrating a typical set of rolling dies utilized in forming the frusto-conical lock on the fastener.

Referring to the drawings, and particularly to FIGS. 1–2 thereof, I show a fastener 10 prior to the formation of a locking portion thereupon, said fastener including an elongated body 12 of cylindrical configuration provided with an integral intermediate abutment flange 14 and a pilot flange 16. The abutment flange 14 and pilot flange 16 define an annular groove 18 and the abutment flange 14 incorporates teeth 20 adapted to impinge upon the surface of a workpiece, not shown, in which the fastener 10 is installed. The function and mode of operation of the abutment flange 14, the pilot flange 16, the groove 18 and the teeth 20 constitute no part of the invention of the present application and are adequately and fully described in U.S. Letters Patent No. 3,125,146, entitled "Sheet Metal Fasteners, Driving Tools, and Method of Driving" which issued on March 17, 1964.

The elongated body 12 incorporates an axial bore 24 which incorporates an internal thread 26 whose successive convolutions extend from one extremity of said bore to the other. In its conventional, non-locking configuration, the successive convolutions of the thread 26 permit fasteners to be freely removed from, and inserted into the bore 24 and no lock is provided to prevent displacement of the associated fastener from said bore by such factors as vibration, and the like.

Customary methods of incorporating locks in the internal thread of a fastener such as the fastener 10 include localized deformation of the wall 28 of the fastener by the impingement of dies upon said wall's external surface at discrete points intermediate its extremities. Another method of providing an internal thread lock in the internal thread 26 involves the squeezing of the opposite extremities of the body 12 of the fastener 10 toward each other in order to compress the successive convolutions of the thread 26 and to cause the displacement of the crests of the internal thread 26 to bind upon a male fastener inserted in the bore 24.

The methods described hereinabove are characterized by the fact that there is no control over the extent of thread deformation which frequently prevents free entry of the corresponding fastener into the bore 24, occasions galling of the thread of the mating fastener and inhibits reuse of the fastener 10 once the mating fastener has been withdrawn from operative relationship with the thread 26 due to the damage to the internal thread 26 occasioned by galling of the thread 26 during the withdrawal of the mating fastener from operative engagement with the thread 26.

The fastener 10, when subjected to the method steps of the invention, assumes the configuration illustrated in FIGS. 3 and 4 of the drawings wherein the wall 28 of the body 12 is tapered from a point intermediate its extremities to one of its extremities. The extent of the taper is, of course, determined by many factors, but I have found that a taper of approximately 4–5°, as indicated at B in FIG. 4, is adequate to produce a locking area which will possess desirable characteristics not attainable by the locks formed through the utilization of prior art methods.

Essentially, therefore, the tapered deformation of the exterior surface of the wall 28 results in a corresponding deformation of the wall of the bore 24 and corresponding deformation of the successive convolutions of the internal thread 26. Thus, a substantially frusto-conical, evenly distributed lock, shown at C in FIG. 4 is imparted to the successive convolutions of the internal thread 26 and an adequate free lead of at least one and one-half threads is permitted to remain on the convolutions of the internal thread 26 to permit free entry of the associated mating fastener.

During the formation of the lock on the internal thread 26 by the method of the invention, to be described hereinbelow, the body 12 of the fastener 10 is slightly elongated as indicated at A in FIG. 4, and a corresponding diminution of the thickness of the wall 28 occurs. Consequently, a spring-like, accordion action is imparted to the inwardly deformed convolutions of the internal thread 26 which results in a dynamic, equally distributed locking action being imparted to said convolutions.

While I have described a particular type of fastener 10 as being provided with a frusto-conical lock on the internal thread 26 thereof, it will, of course, be obvious to those skilled in the art that the teachings of the invention are applicable with equal cogency to various other types of fasteners and it is, therefore, not intended that said teachings be limited to the particular configuration of fastener shown.

The method of imparting the frusto-conical lock to the successive convolutions of the internal thread 26 from a point intermediate the length of said thread to a point adjacent the upper and last convolution of said thread involves, in essence, the steps of forming the elongated fastener body 12, forming the bore 24 in the body; threading the wall of the bore 24 to provide the internal thread 26 thereupon; and engaging the external surface of said wall of the body from a point intermediate the extremities of said body to a point adjacent one extremity thereof to progressively deform the body 12 and impart a uniform taper thereto. Consequently, there is a corresponding deformation of the wall of the bore 24 and a corresponding deformation of the successive convolutions of the internal thread 26 on said wall.

It will be obvious to those skilled in the art that a wide variety of different types of tools may be provided to practice the method of the invention but I have found it quite satisfactory to utilize elongated flat rolling dies 40 which are mounted in an appropriate fixture, not shown, and one of which is adapted to be moved relative to the fastener 10 to form the frusto-conical lock on the successive convolutions of the internal thread 26 from a point intermediate the extremities of said thread to a point adjacent one extremity thereof.

Figure 6:
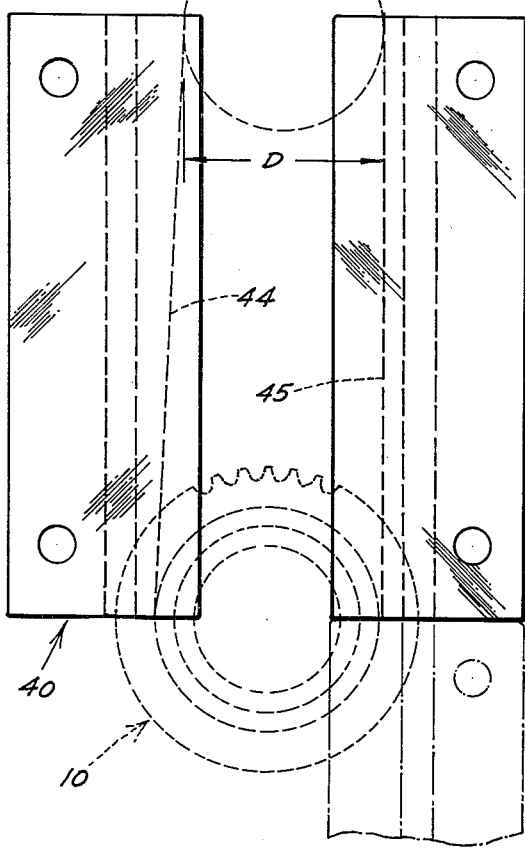
FIG. 6 is a top plan view of the dies shown in FIG. 5.
Figure 7:
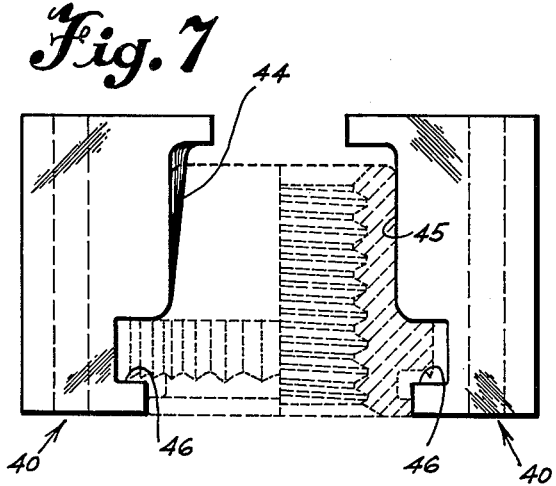
FIG. 7 is an end elevational view.

The rolling dies 40, as best shown in FIGS. 5–7 of the drawings, are constituted by elongated bodies 42 one of which has an inclined forming face 44 confronting the face 45 of the other, said forming faces being adapted to engage the wall 28 of the body 12 of the fastener 10 from a point adjacent the abutment flange 14 of said fastener to a point terminating at the upper extremity of the wall 28. Elongated slots 46 are provided in the bodies 42 of the dies 40 for the reception of the abutment flange 14 and the confronting forming faces 44 and 45 are gradually caused to converge toward each other, as illustrated at D in FIG. 6 of the drawings, to cause the progressive formation of the frusto-conical lock on the internal thread 26 of the bore 24.

Therefore, as relative movement between the dies 40 and the body 12 of the fastener 10 occurs, the taper is gradually formed upon the external surface of the wall 28 and a corresponding taper is formed on the successive convolutions of the internal thread 26 of the bore 24 to provide a self-lock on said successive convolutions.

Moreover, since the deformation of the wall 28 is not localized but occurs gradually and over a major area of the body 12, a gradual deformation of the convolutions of the internal thread 26 occurs which is characterized by the absence of the distortion inherent in the utilization of the other methods of forming a self-lock on the internal thread alluded to hereinabove. Moreover, since the deformation of the successive convolutions of the internal thread 26 conforms to the configuration of a tapered frusto cone, the fastener inserted from the undeformed lead-in portion of the internal thread 26 gradually enters the deformed convolutions of the internal thread 26, and is gradually subjected to the locking action of the self-lock. During the formation of the self-lock upon the internal thread 26, the deformed portion of the body 12 is slightly elongated and since the forces of deformation are equally applied over substantially the entire length of the body 12 of the fastener 10, localized or massive deformation of the convolutions of the internal thread 26 is eliminated. This results in a characteristically smooth entry of the associated fastener into operative relationship with the self-lock provided on the internal thread 26.

Figure 8:
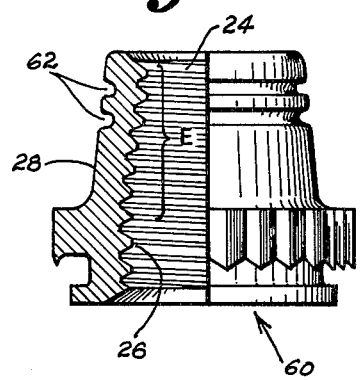
FIG. 8 is a partly sectional view of an alternative embodiment of the fastener of the invention.
Figure 9:
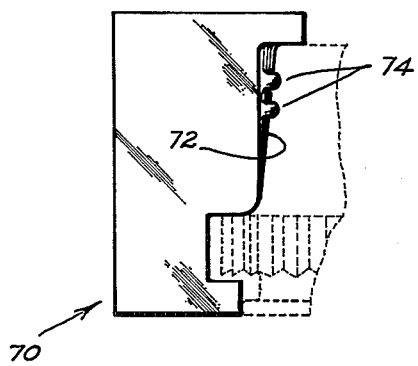
FIG. 9 is an end elevational view illustrating the manner of forming the fastener embodiment of FIG. 8.

An alternative form of fastener 60 which has a thread lock formed thereupon in accordance with the method of the invention is illustrated in FIG. 8 of the drawings and differs from the previously disclosed fastener 10 in the provision of annular grooves 62 in the wall 28 thereof. The annular grooves 62 may be formed in the perimeter of the wall 28 during the rolling of the thread lock indicated at E in FIG. 8, upon the internal thread 26 by the action of a die 70. The die 70 has a forming face 72 incorporating elongated ribs 74 which are adapted to engage the external surface of the wall 28 and form the corresponding annuar grooves 62 in the surface of said wall.

The localized deformation entailed by the utilization of the ribs 74 in the forming face 72 causes stress concentration areas which greatly increase the hoop strength of the wall 28 of the fastener 60.

Figure 10:
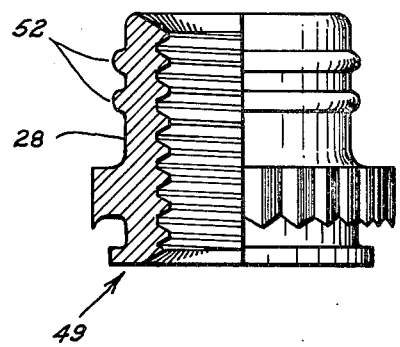
FIG. 10 is a partly sectional view of a blank utilized in forming another embodiment of the invention.
Figure 11:
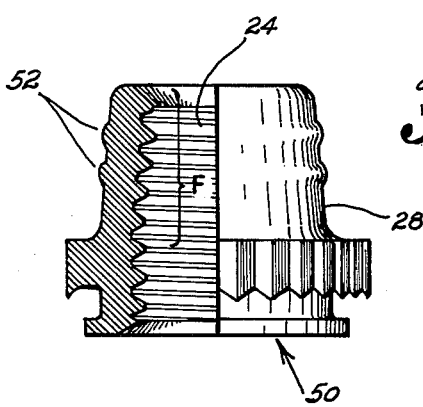
FIG. 11 is a partly sectional view of the blank of FIG. 10 after it it has been deformed to provide a frusto-conical lock upon the threads thereof.

An alternative embodiment 50 of the fastener of the invention is illustrated in FIG. 11 of the drawings, said embodiment being fabricated by the utilization of a blank 49 shown in FIG. 10 of the drawings which incorporates a plurality of circumferential ribs 52 protruding from the surface of the wall 28. When the blank 49 is formed in the rolling dies 40 the ribs 52 are subjected to sufficient pressure to cause the material of the blank 49 embodied in the ribs 52 to partially flow into the wall 28 during the deformation of the blank 49 to provide the taper upon the internal thread 26 as indicated at F in FIG. 11 of the drawings.

The flow of metal from the ribs 52 into the wall 28 results in a significant increase in the hoop strength of the body of the fastener 50 imparting greater strength to the body of the fastener 50 in the area of the deformation of said body. In addition, the frusto-conical taper characteristic of the previously described embodiments of the invention is imparted to the fastener 50.

An alternative set 80 of dies for forming the fastener 10 is illustrated in FIGS. 12 and 13 of the drawings as constituted by three tapered rolling die members 82 which are mounted on supporting spindles 84 secured in mounting blocks 86 and which are adapted to be gradually urged into contact with the exterior surface of the wall 28 to form the frusto-conical taper on the internal thread 26 thereof. A supporting bed 88 which is biased upwardly by a spring 92 is adapted to urge the fastener 10 upwardly into engagement with the perimeters of the rolling dies 82 in the manner illustrated in FIG. 13 of the drawings.

While I have disclosed the teachings of the invention as incorporated in specific embodiments of fasteners and the teachings of the method of the invention as applied by the utilization of specific dies, it will be obvious to those skilled in the art that the frusto-conical lock may be utilized in fasteners other than those illustrative embodiments and that different types of dies may be utilized to provide the frusto-conical lock upon fasteners placed in said dies.

I claim:
1. A fastener including an elongated body having a bore therein and extending axially of said body, the wall of said bore incorporating a thread and said body having circumferentially continuous external wall which is tapered from a point intermediate the extremities of said body to a point adjacent one of said extremities, the wall of said bore being correspondingly tapered and elongated to impart a corresponding uniform radially inward taper and an elongation to the outermost four thread convolutions of the tapered portion, said thread in said tapered portion having progressively smaller crest and root diameters from said intermediate point to said one extremity, said thread in said tapered portion having a greater pitch than the thread in the untapered portion so as to create a locking area upon said thread engageable with a corresponding fastener.

2. A fastener including an elongated body having a centrally located, axially extending bore therein incorporating a thread, said body having a portion thereof deformed to impart to the external wall thereof and to the wall of said bore a uniformly radially inwardly tapered cross section, whereby a corresponding uniform radially inward taper is imparted to said thread for a portion of its length to create a self-lock engageable with a corresponding fastener inserted into said bore in operative relationship with said thread, said thread in said deformed portion having progressively smaller crest and root diameters from the point of commencement of said taper intermediate the extremities of said body to one extremity thereof, said thread in said deformed portion having a greater pitch than the undeformed threads, said deformed body portion being provided with a plurality of spaced circumferential grooves on the exterior surface thereof to increase the stress concentration therein, thereby greatly increasing the hoop strength of the wall of said deformed body portion.

3. A self-locking fastener including an elongated body having an elongated bore extending axially thereof, the wall of said axially extending bore having a thread formed thereupon and said body having a circumferentially continuous external wall a portion of which is uniformly deformed into a tapered and an elongated cross section, the wall of said bore being correspondingly tapered to impart a taper and an elongation to the four outermost thread convolutions of said thread, said taper extending from a point intermediate the extremities of the body to one of the extremities, said thread in said tapered portion having progressively smaller crest and root diameters from said intermediate portion to said one extremity, the pitch of said four thread convolutions being greater than that of the undeformed thread whereby said thread will exert a self-locking action upon the thread of a fastener inserted into said bore and into operative relation with said thread of said bore.

4. In a method of forming a self-lock in a fastener which is characterized by an elongated body having an axially extending bore therein which incorporates an internal thread, the steps of: engaging the exterior of said body in an area defined between a point intermediate the extremities of said body and one extremity thereof; and uniformly deforming at least four thread convolutions of said body from said intermediate point to said one extremity of said body radially inwardly and axially into an elongated and tapered cross section whereby a corresponding uniformly radially inward taper is imparted to at least four thread convolutions of said internal thread underlying said area, said thread in said deformed area becoming progressively smaller from said intermediate portion to said one extremity and having greater pitch than the undeformed thread, said last mentioned step being accomplished by rolling said area between rolling dies.

References Cited by the Examiner

UNITED STATES PATENTS

| | | | |
|---|---|---|---|
| 1,692,497 | 11/1928 | Furlan | 151—14 |
| 2,090,337 | 8/1937 | Stroll. | |
| 2,897,867 | 8/1959 | La Torre. | |

FOREIGN PATENTS

| | | |
|---|---|---|
| 222,528 | 7/1959 | Australia. |
| 213,902 | 12/1924 | Great Britain. |

CARL W. TOMLIN, *Primary Examiner.*